Dec. 11, 1923. Re. 15,730

M. METZGER

FILM SPLICING MACHINE

Original Filed May 17, 1918 2 Sheets-Sheet 1

Inventor:
Maurice Metzger.
By J. M. Wilson
Attorney

Dec. 11, 1923. Re. 15,730

M. METZGER

FILM SPLICING MACHINE

Original Filed May 17, 1918 2 Sheets-Sheet 2

Inventor.
Maurice Metzger.
By J. M. Wilson
Attorney

Reissued Dec. 11, 1923. Re. 15,730

UNITED STATES PATENT OFFICE.

MAURICE METZGER, OF MONTREAL, QUEBEC, CANADA.

FILM-SPLICING MACHINE.

Original application filed May 17, 1918, Serial No. 235,134. Renewed April 22, 1922, Serial No. 556,133. Original No. 1,437,348, dated November 28, 1922. Application for reissue filed May 5, 1923. Serial No. 637,030.

*To all whom it may concern:*

Be it known that I, MAURICE METZGER, a subject of the King of Great Britain, and resident of the city of Montreal, in the Province of Quebec and Dominion of Canada, have invented certain new and useful Improvements in Film-Splicing Machines, of which the following is a full, clear, and exact description.

This invention relates to improvements in film splicing machines, and the object of the invention is to provide a simple, small and inexpensive apparatus which will quickly and easily splice moving picture films.

A further object is to provide a device which will successively clean, cement and lap the film ends and hold the lapped ends until they are dry.

The device consists briefly of a base containing a slide carrying the cleaning, cementing and pressing devices. The base also supports a pair of tables on which the film ends to be spliced are mounted. The slide co-operates with these tables to produce the lapping and pressing. The construction shown and claimed herein is also in the nature of an improvement on the device of Letters Patent #1,324,686 issued to me, in that, in addition to a number of minor improvements, with this new construction, the film holding elements are automatically and mechanically reset to their normal original positions, whereas in my said earlier patent there was no mechanism for this purpose and this readjustment had to be made by hand.

In the drawings which illustrate the invention:—

Figure 1:
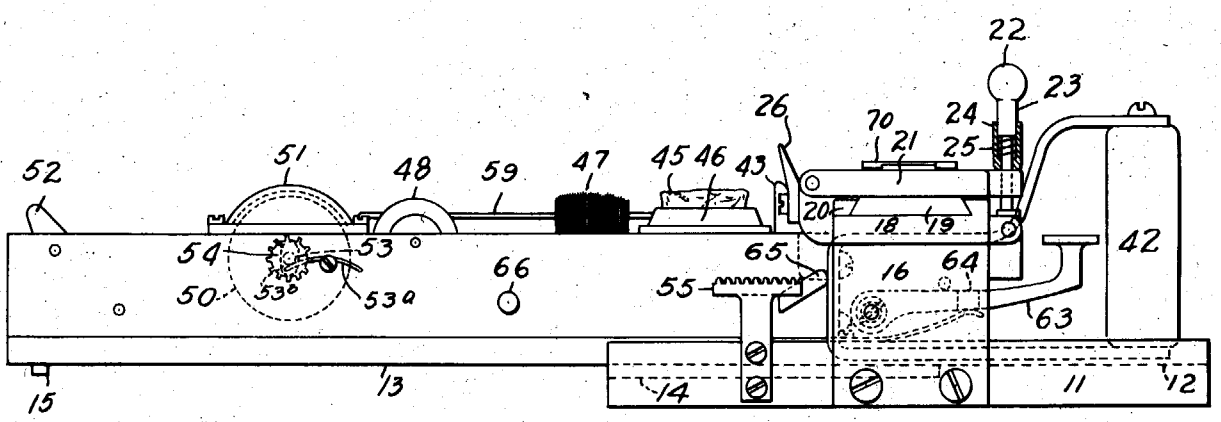
Figs. 1 and 2 are respectively left and right side elevations of the machine.
Figure 2:
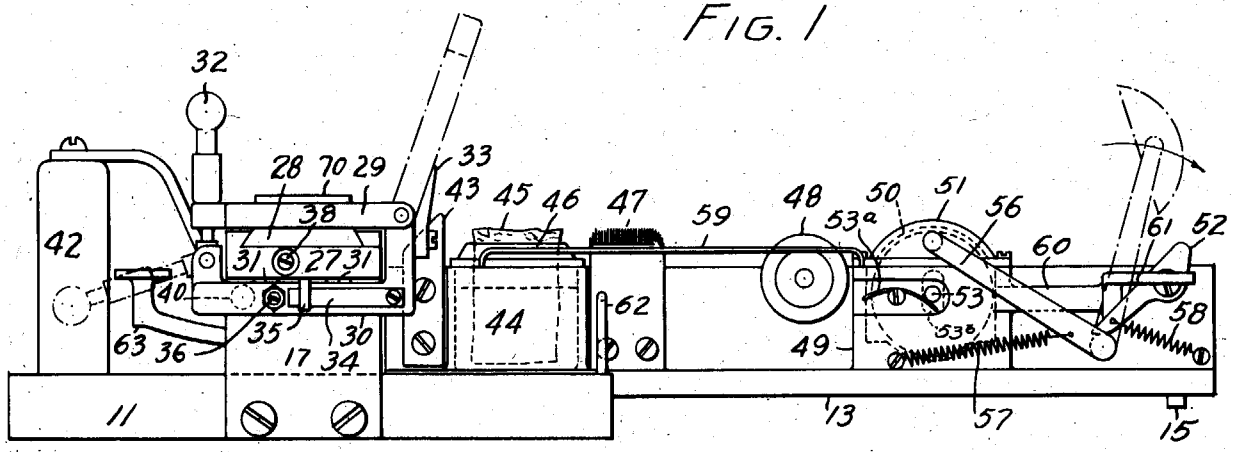

Referring more particularly to the drawings, 11 designates a base having an undercut groove 12, in which a slide 13 is mounted. The base is provided with a further groove 14 extending part way of its length for the reception of a stop 15 on the bottom of the slide. A pair of posts 16 and 17 are secured to the right and left sides respectively of the base.

The post 16 carries a table 18 disposed transversely of the base and provided with a top 19, which may be clamped in any desired position by the bar 20. A cover 21 is hingedly secured at its rear edge to the rear edge of the table and is notched at its front edge to receive a clamp 22. This clamp comprises a shouldered spindle 23 pivoted at one end to the table and surrounded intermediate its ends by a sleeve 24. A spring 25 is mounted in compression between the sleeve and the spindle shoulder and urges the sleeve toward the pivotally supported end of the spindle. A stop 26 is provided limiting the opening movement of the cover 21 and supporting the same when in open position.

The post 17 supports a table 27, which is cut away in its central portion and is provided with a slidable top 28. The cover 29 instead of being hinged to the table is hinged to a frame 30, which lies under the table, and is provided with lugs 31 which pass through the table opening and are attached to the table top 28. The cover clamp 32 and stop 33 are also attached to the frame. It will thus be seen that the cover will move with the table top. A spring 34 is provided on the frame 30 engaging a pin 35 on the table and operating to force the frame cover and table top toward the central axis of the machine. An adjustable stop 36 in the frame abuts the post 17 and limits such inward movement. A trigger 37 is mounted on the post in the table opening and normally engages an adjustable catch 38 on the frame. This trigger is provided with a spring 39, which tends to hold it in engagement with the catch. The trigger operates to hold the table and frame away from the central axis of the machine against the urge of the spring 34. One end of the trigger projects beyond the table, so that it may be oscillated to release the table by means hereafter described. A resetting pin 40 is slidably mounted in the post with one of its ends abutting the frame and the other end projecting beyond the table, so as to be engaged for resetting the table as hereafter described. The inner end of the table top 28 is provided with a movable lip or extension 41 having a limited in and out and a limited vertical movement. This in and out and vertical movement may be obtained in any one of several well known and usual methods of mounting a lip of this kind, so that the whole lip may move inwardly and outwardly and the inner edge of the lip may move vertically while the outer edge remains stationary. The forward or inward movement of the said lip 41 is caused by the forward or inward movement of the frame 30 and the table top 28 under the urge of the spring 34, and the vertical depression of the lip 41 after it is free from the cam 59 is caused by the pressure foot 70. To permit the knife 43 to enter between the lip 41 and the extension 69 on the table top 19 the end corner of the front edge of the said lip may be rounded slightly and the entire lip may be yieldably supported on the table top 28.

Figure 3:
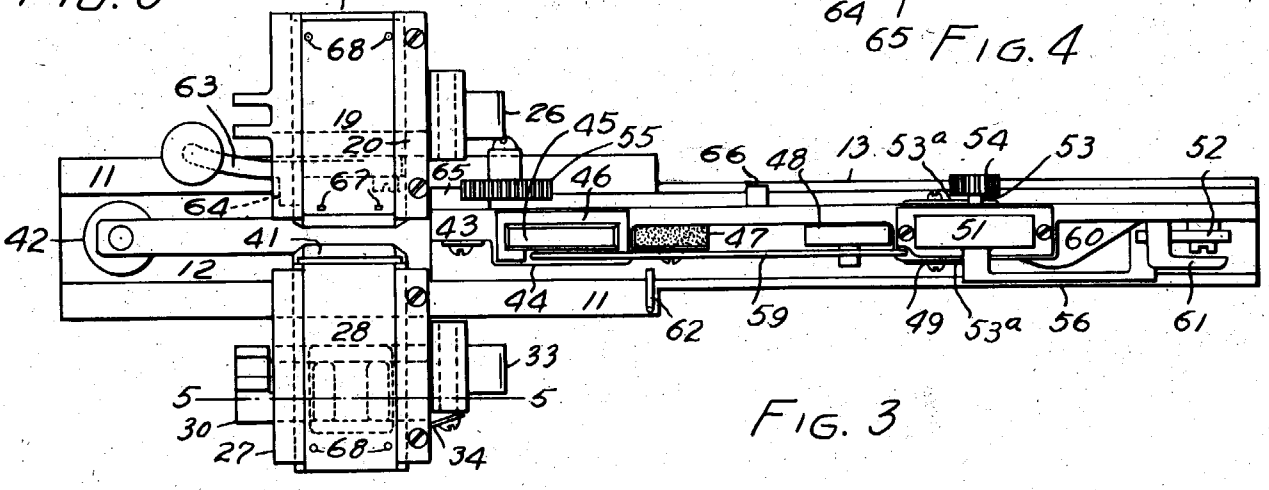
Fig. 3 is a plan view of the device with film clamp covers removed.

The slide 13 is provided from front to rear in the order named with an operating handle 42; a knife 43 having an inclined cutting edge; a water well 44 from which water is fed through a wick 45 mounted in the well cover 46; a wire brush 47 for scraping the gelatine from the film; a drying and polishing roll 48; a cement well 49 containing a cement applying wheel 50 and having an automatically operating cover 51; and a pivotally mounted presser lever 52. The wick brush, drying roll and cement wheel are preferably located in the same plane, while the knife and the presser lever are very slightly offset to the right, as will be clearly seen in Figure 3. The cement applying wheel 50 is fixedly mounted on a revoluble spindle 53, which is provided on the left side of the machine with a pinion 54, adapted to engage a rack 55 mounted on the base for the purpose of imparting rotation to the wheel. The spindle 53 has a slight vertical movement in a slot 53[b] and is upwardly pressed by springs 53[a]. The cover 51 is carried by an arm 56 pivotally mounted on the slide and provided with a spring 57, which operates normally to keep the cover tightly closed over the wheel. The operating lever 52 is provided with a spring 58 arranged to urge the upper end of the lever upwardly. The tail of the lever may conveniently bear against the supporting pivot of the arm 56 to limit the lever movement. In addition to these elements, the slide is provided with a cam 59, which may conveniently be in the form of a length of stiff spring wire extending between the wells 44 and 49. This cam engages the underside of the movable lip 41 and presses it upwardly. A second cam 60 is provided on the slide in position to engage the resetting plunger 40, while a striker 61 is mounted on the slide in position to oscillate the trigger 37. A post 62 is mounted on the base in position to engage the under side of the cover arm 56.

In order to control the movement of the slide, a spring pressed arm 63 carrying a stop 64 is pivotally mounted on the post 16. At the front end of the slide a stop 65 is mounted having its lower surface inclined, so that it will ride over and depress the stop 64 during movement in one direction but will be arrested by the stop during movement in the opposite direction. A second stop 66 is provided on the slide farther to the rear in position to engage the stop 64.

Figure 4:
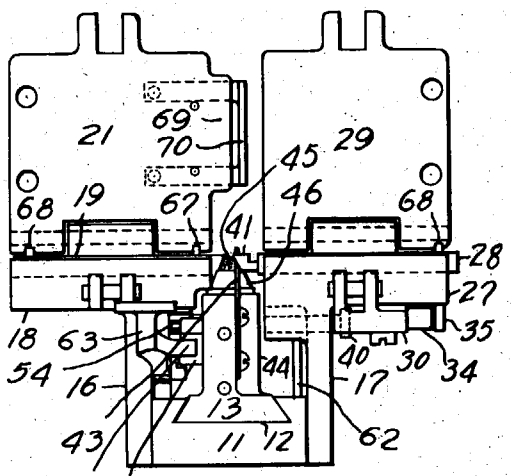
Fig. 4 is a rear end elevation.
Figure 5:
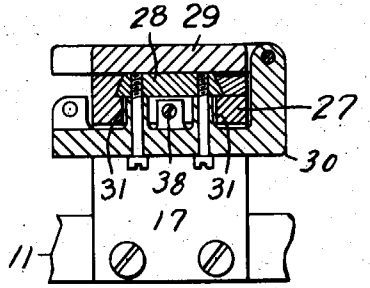
Fig. 5 is a section on the line 5—5, Figure 3.
Figure 6:
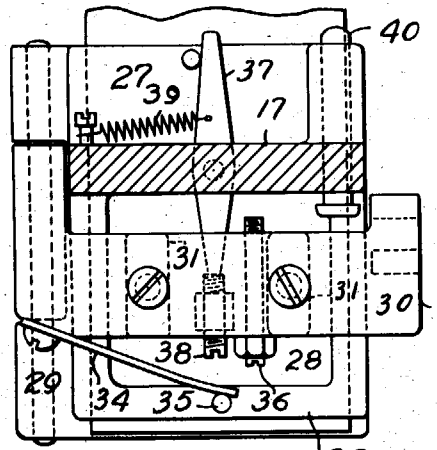
Fig. 6 is an inverted plan view of one of the tables showing the lapping mechanism.

In order to hold the film to be spliced, the table top 19 is provided at the inner end with a pair of pins 67 adapted to enter the marginal perforations of the film. At the outer ends, both tables are provided with pins 68 adapted to engage the outer edges of the film. It will be clearly seen in Figures 3 and 4 that the knife 43 operates against the lip 41 of the sliding table top 28 and, therefore, at one side of the slot or space existing between the table tops for the passage of the various elements on the slide. It will be seen in Figure 4 that the cover 21 is provided with an extension 69 which overlaps this space. The cover 21 is also provided with a resiliently mounted presser foot 70, which bears downwardly on the table top extension 41.

The operation of the device is as follows:—

The slide is set in its rearmost position and the covers 21 and 29 opened. The two ends of a film are brought into overlapping relation and laid on the table tops, sensitized sides down, the lower film being on the left hand table and the upper on the right hand. The films are secured by placing them on the pins 67 and are held in proper alignment by the pins 68. The covers are then clamped down and the machine is ready to operate. It will be noted that when thus arranged, the overlapping portion of the film spans the gap between the tables and is covered over by the extension 69 of the cover 21. The shortened cover 29 exposes the film lying on the lip 41, against which it is held by the presser foot 70. The slide is now drawn forward, so that the knife forces its way between the cover extension 69 and the movable lip 41, severing both layers of film. As the film is held close on each side of the knife, the cut will be clean and smooth. While the knife is passing through the film, the stop 65 on the slide rides over the lever stop 64 and thus prevents the slide being moved rearwardly to repass the knife through the film, without depressing the lever 63. The slide is now worked back and forth several times between the limits defined by the engagement of the stop 65 and 66 with the lever stop 64. This movement passes the wet wick 45 and wire brush 47 repeatedly under the film, so that the gelatine on the sensitized lower side of the film is scraped away to expose the material of the film. During this operation, the movable lip 41 rides on the cam 59, which presses it up against the presser foot 70, so that the end of the film on the right hand table is tightly clamped. When the operator is satisfied that the gelatine has been thoroughly cleared off the exposed portion of film on the left hand table, he depresses the lever 63 to disengage the stops 64 and 66 and draws the slide forwardly, so that the drying and polishing roll 48 is brought under the cleaned end of the film. At about the time the drying roll engages the film, the arm 56 of the cement well cover strikes the post 62, so that continued movement of the slide causes the cover to be lifted away, exposing the wheel. As the cover commences to lift, the pinion 54 engages the rack 55 and the wheel is rotated, with the result that when it passes under the film, it is coated with wet cement from the well, which is transferred to the cleaned and burnished end of the film on the left hand table. The springs 53[a] force the wheel tightly against the film, so that the cement is positively applied and also so that rotation of the roll after the pinion leaves the rack will be assured. Immediately after the cementing wheel passes under the film, the striker 61 engages the tail of the trigger and moves it whereby the frame 30 and table top 28 are released and moved inwardly by the pressure of the spring 34. The movable lip 41 on the inner end of the table top 28 being free of the cam 59, is depressed by the presser foot 70, so that the upper surface of the film end thereon is positioned below the under surface of the cleaned and cement coated film end held on the table 18. This inward movement of the frame 30, therefore, in addition to causing an overlapping of the film ends, also brings the movable lip 41 under the cover extension 69, and immediately thereafter the presser lever 52 runs under the lip 41 and presses it tightly up against the rigid cover extension thereby bringing together in close engagement the freshly cemented and overlapped ends of the film. When the presser lever is centrally disposed under the table extension, the slide stop 15 reaches the end of its groove 14 and the slide comes to rest. The operator now lets the machine stand for as long as may be necessary for the cement to set. He then opens both covers and lifts out the film, which will be found neatly and securely spliced. The surplus overlappage of the ends, which are trimmed off by the cutting operation, will either fall off or may be easily removed. With the covers still open, the lever 63 is depressed and the slide driven as far rearwardly as it will go. The machine is now ready to make another splice. In this rearward motion, the striker 61 disengages the trigger 37, which is drawn by its spring 39 against the catch 38. As the rearward motion continues, the cam 60 drives the plunger 40 outwardly, thus resetting the frame and table top. When the frame resumes its outer position, the trigger is drawn into position by its spring to hold the frame out against the action of the spring 34. The cement well cover arm 56 then disengages from the post 62 and the cover is closed by the spring 57. If the machine is to remain idle for any length of time, it is advisable to empty the well 44 of water or other washing liquid and cleanse the wick and brush and also to empty the cement well 49 and cleanse the cementing wheel.

It will be very readily understood from the foregoing description that the cleaning and overlapping of the film ends may be done much more rapidly and accurately by this means than is possible by hand, without a great expenditure of time. When a quick-drying cement is used, the pause necessary for the cement to set will be very brief, and in any case, less than the time which would be consumed in holding or clamping the ends by hand. Where a great number of splices are made, each operator may work two machines, so that a splice may be made with one machine while a previously made splice is drying in the other machine. In this way no time will be lost.

Having thus described my invention, what I claim is:—

1. In a film splicing machine the combination of:—film holding elements, means adapted to hold said elements out of overlapping relation comprising a trigger mounted on one of the said film holding elements, a reciprocating member adapted to move relatively to the said film holding elements, and to cut, clean and cement the film ends, means adapted to move said film holding elements into overlapping relation, and means adapted to release the said trigger and move the film holding elements out of overlapping relation.

2. In a film splicing machine, the combination of a gripping member for gripping the two film ends to be spliced, a second member slidable in a rectilinear path with respect to the gripping member, means on the second member for severing the film ends, and for cleaning and applying cement to one of them, means on the first member for automatically moving one of the film strips towards the other to cause the film ends to overlap, and means for pressing the overlapped ends toward each other.

3. In combination with a device constructed in accordance with claim 1, means adapted to press the overlapped film ends.

4. In combination with a device constructed in accordance with claim 1, a movable lip on one film holding element, a rigid lip on the other film holding element, and a film cutting knife adapted to move between and in close engagement with the said lips during the non-overlapping relation of the film holding elements.

5. In a film splicing machine, the combination of:—a pair of film holding elements, relatively slidable in a rectilinear path, an independently movable lip on one of said elements, means adapted to depress said lip and the film thereon out of alignment with the film in the other holder, means adapted to move one of the film holding elements to bring the film ends into overlapping relation, and means adapted to hold the said elements against movement.

6. In combination with a device constructed in accordance with claim 5, means adapted to cut, clean and cement a film in the holding elements, and to release the means for locking the movable film holding element against movement on completion of the cementing operation.

7. In a film splicing machine, the combination of:—a pair of relatively movable film holding elements, an independently movable lip on one of said elements, means adapted to depress said lip and the film thereon out of alignment with the film in the other holder, means adapted to move one of the film holding elements to bring the film ends into overlapping relation, means adapted to hold the said elements against movement, means adapted to cut, clean and cement a film in the holding elements and to release the means for locking the movable film holding element against movement on completion of the cementing operation, and a cam on the said cutting, cleaning and cementing means adapted to hold the independently movable lip on the film holder against depression until just prior to the overlapping operation.

8. In a film splicing machine, the combination of:—a pair of tables adapted to hold films, one having a fixed top and the other a movable top, means adapted to clamp films to the said table tops, a frame connected to the said movable top and carrying latching means for holding the movable table top away from the fixed table top, and means cooperating with said latching means adapted to move the said tops into and out of overlapping relation.

9. In a film splicing machine, means for automatically cutting, cleaning and cementing the film, the cementing means including a reservoir, a wheel operating therein, a cover for the reservoir and wheel; operating means for automatically rotating said wheel prior to the cementing operation to present a freshly wetted portion of the wheel to a film, means for automatically removing the cover at the commencement of the cementing operation and means for pressing the wheel tightly against the film whereby rotation of the wheel is continued.

10. In a film splicing machine, the combination of:—film holding elements, a reciprocating member adapted to move toward and from the said film holding elements and provided with film cutting, cleaning, cementing and splice pressing devices, and adapted to operate fixed and movable stops arranged to permit engagement between only the film end and the cleaning devices on the said reciprocating member.

11. In a film splicing machine, the combination of:—film holding elements, a reciprocating member adapted to move toward and from the said film holders and provided with cutting, cleaning, cementing and splice pressing devices, a plurality of stops mounted on the said reciprocating member, a lever mounted on the support of one of the film holding elements and provided with an abutment, the said abutment and stops being adapted to limit the movement of the said reciprocating member with relation to the film, for the operations of the cleaning devices on the said reciprocating member, and means adapted to move the said abutment out of the line of travel of the said stops, whereby the cementing and splice pressing devices may be brought into engagement with the film and the cutting device repassed between the film holders.

12. In a film splicing machine, the combination of:—elements adapted to hold films; means adapted to hold said elements out of overlapping relation; a reciprocating member adapted to move toward and from said elements and provided with cutting, cleaning and cementing devices; means for limiting the movement of the said reciprocating member whereby only the said cleaning devices may engage with the film; means for releasing the reciprocating member from the said limitation of movement whereby the cementing device may engage with the film; means adapted to move the film holding elements into overlapping relation; and means for moving the said film holding elements out of overlapping relation, whereby the reciprocating member may be returned to its original location.

13. In a film splicing machine, the combination of a pair of gripping elements for gripping the two film ends to be spliced, a working member relatively slidable in a rectilinear path with respect to the gripping members, means on the working member for severing the film ends, and for cleaning and applying cement to one of the ends, means for moving one of the gripping elements toward the other to cause the film ends to overlap, and means for automatically moving one of the gripping elements away from the other after the splicing operation is completed.

14. A machine of the character set forth in claim 13, in combination with latching means for holding one of the gripping members spaced from the other.

15. A machine of the character set forth in claim 13, in combination with means for pressing the overlapped film ends into contact.

MAURICE METZGER.

Witnesses:
E. D. SAMPSON,
S. MEREDITH.